US010711167B2

(12) United States Patent
De Block et al.

(10) Patent No.: US 10,711,167 B2
(45) Date of Patent: Jul. 14, 2020

(54) ADHESIVE COMPOSITION

(71) Applicant: Strongbond B.V., Dinxperlo (NL)

(72) Inventors: Rudolph Frank De Block, Steenenkamer (NL); Leonard Johan Heusinkveld, Aalten (NL)

(73) Assignee: Strongbond B.V., Dinxperlo (NL)

( * ) Notice: Subject to any disclaimer, the term of this patent is extended or adjusted under 35 U.S.C. 154(b) by 144 days.

(21) Appl. No.: 15/772,094

(22) PCT Filed: Oct. 26, 2016

(86) PCT No.: PCT/NL2016/050743
§ 371 (c)(1),
(2) Date: Apr. 30, 2018

(87) PCT Pub. No.: WO2017/074184
PCT Pub. Date: May 4, 2017

(65) Prior Publication Data
US 2018/0320036 A1 Nov. 8, 2018

(30) Foreign Application Priority Data
Oct. 30, 2015 (NL) ..................................... 2015698

(51) Int. Cl.

| | |
|---|---|
| ***C09J 11/06*** | (2006.01) |
| ***C09J 107/02*** | (2006.01) |
| ***C09J 109/04*** | (2006.01) |
| ***C09J 109/08*** | (2006.01) |
| ***C09J 111/02*** | (2006.01) |
| ***C09J 147/00*** | (2006.01) |
| ***C09J 11/08*** | (2006.01) |
| ***C08K 3/26*** | (2006.01) |
| ***C08K 5/05*** | (2006.01) |
| ***C08K 5/101*** | (2006.01) |
| ***C09J 127/04*** | (2006.01) |
| *C09J 129/14* | (2006.01) |
| *C09J 175/04* | (2006.01) |
| *C08K 5/00* | (2006.01) |

(52) U.S. Cl.
CPC .............. *C09J 147/00* (2013.01); *C08K 3/26* (2013.01); *C08K 5/05* (2013.01); *C08K 5/101* (2013.01); *C09J 11/08* (2013.01); *C09J 127/04* (2013.01); *C08K 5/0041* (2013.01); *C09J 11/06* (2013.01); *C09J 107/02* (2013.01); *C09J 109/04* (2013.01); *C09J 109/08* (2013.01); *C09J 111/02* (2013.01); *C09J 129/14* (2013.01); *C09J 175/04* (2013.01)

(58) Field of Classification Search
None
See application file for complete search history.

(56) References Cited

U.S. PATENT DOCUMENTS

| | | | | |
|---|---|---|---|---|
| 5,236,987 | A | 8/1993 | Arendt | |
| 2004/0138358 | A1* | 7/2004 | Koch | C07C 69/78 524/297 |
| 2006/0157196 | A1 | 7/2006 | Koepnick et al. | |
| 2011/0311809 | A1* | 12/2011 | Yamaguchi | C09J 133/08 428/346 |

FOREIGN PATENT DOCUMENTS

| | | |
|---|---|---|
| EP | 1415978 | 5/2004 |
| EP | 2397531 | 12/2011 |

OTHER PUBLICATIONS

Communication Pursuant to Rules 161(1) and 162 EPC dated Jun. 8, 2018 From the European Patent Office Re. Application No. 16798584.5. (4 Pages).

International Search Report and the Written Opinion dated Jan. 18, 2017 From the International Searching Authority Re. Application No. PCT/NL2016/050743. (10 Pages).

Search Report and Written Opinion dated Jun. 23, 2016 From theRijksdienst voor Ondernemend Nederland, Octrooicentrum Nederland, Onderdeel van Rijksdienst voor Ondernemend Nederland, Octrooien, Valorisatie en Sectoren Re. Application No. NL 2015698. (9 Pages).

* cited by examiner

*Primary Examiner* — Richard A Huhn

(57) ABSTRACT

The present invention is in the field of an improved adhesive composition, use of said composition and products comprising said composition. The adhesive composition may be a one component and a two component adhesive, each component typically comprising various ingredients. The present adhesives are water-based dispersions.

10 Claims, No Drawings

ADHESIVE COMPOSITION

RELATED APPLICATIONS

This application is a National Phase of PCT Patent Application No. PCT/NL2016/050743 having International filing date of Oct. 26, 2016, which claims the benefit of priority of Netherlands Patent Application No. 2015698 filed on Oct. 30, 2015. The contents of the above applications are all incorporated by reference as if fully set forth herein in their entirety.

FIELD AND BACKGROUND OF THE INVENTION

The present invention is in the field of an improved adhesive composition, use of said composition and products comprising said composition. The adhesive composition may be a one component and a two component adhesive, each component typically comprising various ingredients. The present adhesives are water-based dispersions.

The present invention is in the field of adhesives and for applying the adhesive to a first and/or second surface and then adhering the two surfaces. Prior art adhesives suffer from one or more disadvantages. Below an indication is given of various requirements of adhesives for a better understanding. It is noted that it is rather difficult to adapt characteristics of adhesives to specific requirements. It is intrinsically difficult to adapt properties of an adhesive, as improving a first characteristic may typically result in a deterioration of a second characteristic.

General properties of adhesives are open time (working time to make a bond, where the surface still retains sufficient tack, which can range from seconds for fast-setting adhesives to infinity for pressure-sensitive adhesives), set time (time to form a bond of acceptable strength), dry time, (initial) tack ((initial) degree of surface stickiness of the adhesive), applicability and adhesion to a diverse range of substrate surfaces, contactability, flexibility of an adhesive film, temperature stability, storage stability, viscosity, and surface energy (influences wetting of different kind of surfaces).

Adhesives often consist of one base material with various additives. For a two-component adhesive a first and second component, each component optionally comprising more than one constituent, are mixed shortly before applying, such as by a spray-gun. The first and second component can typically not be stored in a mixed form. Adhesives may relate to water based adhesives and to organic solvent based adhesives.

In manufacturing of larger objects, such as mattrasses and furniture, adhesives are often applied to fix parts of the large object together. Most adhesives are applied using either air-spray equipment or air-assisted spray equipment.

As mentioned above, a problem with many prior art aqueous adhesives is that they are not stable over time. For instance unexpectedly the plasticizer of the adhesive may partly or fully segregate from the adhesive composition, typically as a fluid like substance. As a result the adhesive can no longer be used, the equipment in use needs to be cleaned, production may need to be halted, etc.

A further problem is that for the dispersion component of an adhesive itself, either being the stabilized one component adhesive to be modified later before use, or the above first component of a two component system, the pH is also not stable. Typically the initial pH is in the order of 7-13.5. After addition (typically by intimately mixing) of further components, such as a plasticizer, the pH typically drops. Depending on the plasticizer used and the amount of plasticizer used the pH can easily drop 2.5-3.5 units (i.e. from about 12 to about 9). At a lower pH the adhesive composition is less stable. Such negatively effects the life time of the adhesive, the storage time, characteristics of the adhesive itself, such as open time and peel strength, and so on.

For specific applications a stable adhesive is required with a relatively low glass transition temperature $T_g$. Such may also be the case for adhesives that are used at relatively low temperatures.

Some background documents recite suitable preparation methods of benzoate esters. For instance, EP 1 415 978 A1 recites preparation methods of specific isododecyl benzoic esters. These ester can be used in non-aqueous, PVC compositions as a replacement of plasticizers that have insufficient cold flexibility at low viscosity and storage stability. The benzoate esters are incorporated in the PVC as a plasticizer in order to process the PVC further.

In an alternative hydroxy benzoic esters (which are different from the above benzoic esters) find use as solid plasticizers in non-aqueous heat-sensitive adhesive materials, further comprising a thermoplastic resin, typically acryl-based, which is obtainable by emulsion polymerization, and a tackifier (EP 2 397 531 A1). The document is concerned with a heat sensitive adhesive with improving tackiness to rough surface materials and blocking when using a thermal head for activation, and has good printer conveyance under high temperature and high humidity.

In an alternative approach to a dispersion of polychloroprene and the like water-soluble polysaccharides, such as celluloses, may be used (US 2006/157,196 A1), in combination with a high amount of a solubility reducing compound, i.e. to better dissolve the polysaccharide in water, and a polyimerizate, in order to obtain a high early tack. The solution can thus not be considered as a dispersion. A range of plasticers may be used.

In order to improve coalescing properties in latex based paint or as plasticizer in a dispersion of a synthetic elastomer (consisting of 60-75 wt. % polymer, 30-40 wt. % plasticer and 1-5 wt. % stabilizer), specific $C_{10}$-$C_{12}$ benzoic esters, and especially isododecyl esters are mentioned in U.S. Pat. No. 5,236,987 A. The document is in so far as plasticizers are concerned dedicated to PVC. In so far as paints are concerned high amounts of acrylate are present. For the present adhesives coalescence is discouraged.

It is therefore an object of the present invention to provide a water-based adhesive which overcomes one or more of the above disadvantages, without jeopardizing functionality and advantages.

SUMMARY OF THE INVENTION

The present invention relates to an aqueous adhesive composition and a product comprising the composition. The present adhesive compositions provides an improved stability, better mixing characteristics of the plasticizer, no segregation of the plasticizer, an improved glass transition temperature, an improved peel strength, no soap forming, an improved compatibility to the dispersion (in particular polychloroprene), and a better pH stability, whereas other characteristics are comparable to prior art adhesive compositions.

The present composition can be used in one component adhesives (1K) and in two component adhesives (2K). The term two components adhesive is used in its usual sense as would be understood by a person skilled in the field of adhesives. The two component adhesive coagulates upon mixing of (at least) the first- and the second-components thereof in appropriate ratios and under appropriate conditions (temperature, humidity etc.). Coagulating may also occur under sub-optimal conditions; in such a case coagulating is relatively slower. For a two component adhesive typically two fluids are combined shortly before applying the adhesive. The first fluid or component preferably comprises 40-97 wt. % of a dispersion, preferably 50-80 wt. %, selected from a polychloroprene dispersion, polyurethane dispersion, natural rubber dispersion, styrenebutadiene-styrene copolymer dispersion, nitrile-butadiene rubber, polyvinyl butyral dispersion, styrene-butadiene rubber dispersion, and combinations thereof. The dispersion, or a combination of dispersion typically has 30-80 wt. % solids, preferably 40-70 wt. % solids, more preferably 45-65 wt. % solids, such as 50-60 wt. % solids, e.g. 53-58 wt. % solids.

The present composition comprises 2-50 wt. % plasticizer, preferably 6-40 wt. % plasticizer, more preferably 7-30 wt. % plasticizer, even more preferably 9-25 wt. % plasticizer, such as 10-20 wt. % plasticizer, e.g. 12-18 wt. % plasticizer. Contrary to typical prior art plasticizers used, such as phthalates and terephthalates, such as di-isobutyl phthalate (DIBP) and dibutyl terephthalate (DBT), the present composition comprises a benzoate ester, and specifically a mono-ester of benzoic acid. It has been found upon experimentation that especially the $C_4$-$C_{16}$ alcohol esters as exemplified below show improved characteristics:

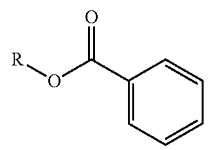

wherein R is a $C_4$-$C_{16}$ primary or branched alkyl group, optionally having one or more double bonds (alkenes, cis- or trans alkenes, di-alkenes, etc.), and combinations thereof. The oxygen of the ester group may in principle be attached to any one of the $C_4$-$C_{16}$ carbon atoms, i.e. to a first carbon atom, a second, . . . and $n^{th}$ carbon atom ($n \in [4,16]$, e.g. depending on the precise alcohol used for forming the ester. Examples of primary alkyl groups are butyl, pentyl, hexyl, heptyl, octyl, nonyl, decyl, undecyl, dodecyl, tridecyl, tetradecyl, pentadecyl, and hexadecyl. It is noted that longer chain ($C_8$-$C_{10}$) phthalate and terephthalate esters can not be mixed into an adhesive composition; longer chain esters, as the present benzoate esters, are often considered not suited for mixing. In addition it came as a surprise that at a relatively high pH (well above 11) a mono-ester, and in particular the present benzoate ester, could be used without saponification.

It has been found that the present plasticizer is incorporated in the present dispersion and the dispersion stays monodisperse; no extra peaks relating to other sized particles are observed; the dispersed particles only grow in size after introducing the present ester.

The present composition further comprises (a8) 0.1-40 wt. % pH stabilizer, preferably 0.2-20 wt. %, more preferably 0.5-10 wt. %, (a9) 0.1-2 wt. % of one or more of a fungicide, a bactericide, and an algaecide, preferably 0.2-1 wt. %, more preferably 0.3-0.5 wt. %, The present composition further comprises as a remainder a fraction water, wherein all parts are calculated based on the total weight of the composition, unless stated otherwise. Water is typically provided as demineralized water.

The second fluid, if present, relates to a second component of a two component adhesive. The second fluid is preferably an activator. It is preferably selected from a salt of a multivalent metal such as zinc, aluminum or calcium; or an acid solution, such as selected from citric acid, formic acid, acetic acid, lactic acid, and mineral acid having a pH below 5, preferably below 4.5, most preferably below 4, salts, such as sodium polyphosphate, and sodium borate, and combinations thereof.

In an example the dynamic viscosities of the first- and second-fluids are in the range of 0.2 mPa*s to 25 Pa*s at 25° C. It has been found that for intimate mixing, obtaining a good spray pattern, reducing overspray, etc. these viscosities suit particularly well.

The adhesives may be applied to a surface by a spray gun in an air-less and air assisted modus, by a roller, etc. In an example, pressure for spraying is provided by one or more selected from: positive displacement pumps, such as double diaphragm pumps or piston pumps; pressurized systems such as pressure tanks; and, gravity feed feeding systems. The surface may be a relatively large surface, such as a matrass, an insulation material, a foil, a sheet, a foam, and a cloth, a tubing, a wall, a plate, concrete, stone, metal, and a coupler, or a smaller surface, such as a fiber matrix. For instance when an adhesive is used to adhere together fibers, such as very strong fibers as aramid, Twaron, carbon, and Dyneema, and likewise to adhere matrices of fibers, it has been found recently that such matrices wherein an adhesive with a lower $T_g$ is used, performs significantly better.

Thereby the present invention provides a solution to one or more of the above mentioned problems.

a. Advantages of the present description are detailed throughout the description.

DESCRIPTION OF SPECIFIC EMBODIMENTS OF THE INVENTION

The present invention relates in a first aspect to a composition according to claim 1.

In an example of the present composition the alcohol is selected from single branch alcohols, branched alcohols, primary alcohols, secondary alcohols, tertiary alcohols, substituted alcohols, alcohols comprising one or more double bonds, alcohols comprising one or more triple bonds, and combinations thereof, such as butanol, pentanol, hexanol, heptanol, octanol, nonanol, decanol, undecanol, dodecanol, tridecanol, tetradecanol, pentadecanol, and hexadecanol. It has been found that not too long chained alcohols, and not too short alcohols, the length of the alcohol relating to a longest chain thereof, are preferred in terms of applicability to the present composition, mixing properties, lowering Tg, stabilizing the pH, etc. In particular it is preferred to use a C9-C11 alcohol, preferably a C10 alcohol. It is noted that the present esters often relate to a mixture of esters, e.g. a C9-C11 benzoate mixture, having mainly C10-benzoate, and some C9- and C11 benzoate.

The present composition may have various optional components, such as (a5) 0.1-40 wt. % of a resin dispersion, preferably 0.2-30 wt. %, more preferably 0.3-20 wt. %, the resin dispersion comprising 30-70 wt. % solids, preferably having 40-60 wt. % solids, more preferably having 45-55 wt. % solids, (a6) 0.1-8 wt. % of an acid binder, preferably 0.2-5 wt. %, more preferably 0.3-3 wt. %, (a7) 0.1-15 wt. % thickener, preferably 0.2-10 wt. %, more preferably 0.5-5 wt. %, (a10) 0.001-1 wt. % defoamer, preferably 0.005-0.5 wt. %, more preferably 0.01-0.05 wt. %, (a11) 0.001-1 wt. % emulsifier, preferably 0.005-0.5 wt. %, more preferably 0.01-0.05 wt. %, (a12) 0.001-1 wt. % wetting agent preferably 0.01-0.3 wt. %, more preferably 0.05-0.1 wt. %, (a13) 0.1-2 wt. % of a colorant, preferably 0.2-1 wt. %, more preferably 0.3-0.5 wt. %, and (a14) 0.1-3 wt. % of anti-degradant, preferably 0.2-1 wt. %, more preferably 0.3-0.5 wt. %.

In an example of the present composition the dispersion (a1) comprises 16-97 wt. % polychloroprene dispersion, preferably 20-80 wt. %, preferably 40-76 wt. %, more preferably 50-72 wt. %, even more preferably 55-70 wt. %, such as 60-65 wt. %.

In an example of the present composition a (dynamic) viscosity is 20-25000 mPa*s (according to ISO 2555), such as 0.1-5 Pa*s. Such a viscosity is preferred in view of the manner of application, such as by a spray gun.

In an example of the present composition a pH is 7-13.5, such as 10-11.5. This pH is found to keep the composition stable for a prolonged period of times, typically a few months, and prevents the plasticizer from segregating.

In an example of the present composition a glass transition temperature is 193-223K (−80 to −50° C.) (according to ISO 22768). For sake of comparison prior art adhesives with 17.8 wt. % DIBP or DBT have a glass transition temperature of 218.3 K and 212.0 K, respectively, versus the present 17.8 wt. % $C_{10}$-benzoate mono ester of 208.5K. The present adhesive is therefor also particularly suited when used at a low temperature.

In an example of the present composition (a6) the acid binder is one or more of a basic metal salt, preferably an oxide salt, a bicarbonate salt, or a carbonate salt.

In an example of the present composition (a7) the thickener is one or more of a gum.

In a second aspect the present invention relates to a use of the present adhesive composition for one or more of obtaining a low glass transition temperature, for high energy impact application, for prolonged storage, for improved stability, and for low temperature use.

In a third aspect the present invention relates to a product comprising the present adhesive composition.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

EXAMPLES/EXPERIMENTS

The invention although described in detailed explanatory context may be best understood in conjunction with the accompanying examples.

TABLE 1

Adhesive compositions according to the invention (1-3), prior art compositions 4 (DIBP) and 5 (DBT), and comparative example 6 without plasticizer.
Adhesive compositions

| | Sample no. | | | | | |
|---|---|---|---|---|---|---|
| | 1 | 2 | 3 | 4 | 5 | 6 |
| Dispercoll | 600.0 | 600.0 | 600.0 | 600.0 | 600.0 | 600.0 |
| Benzoate | 80.0 | 160.0 | 240.0 | | | |
| DIBP | | | | 160.0 | | |
| DBT | | | | | 160.0 | |
| Additives + water | 140.25 | 140.25 | 140.25 | 140.25 | 140.25 | 140.25 |
| Totaal | 820.25 | 900.25 | 980.25 | 900.25 | 900.25 | 740.25 |

TABLE 2

Results of various $T_g$ measurements using method EN ISO 16805 on the adhesive compositions of table 1.
Determination of the Glass Transition Point (Tg)
Equipment: Kalorimeter DSC-7 (Fa. Perkin-Elmer)
Heizrate 20 K/min, Kühlrate 320 K/min

| | Sample no. | | | | | |
|---|---|---|---|---|---|---|
| | 1 | 2 | 3 | 4 | 5 | 6 |
| | Values in ° C. | | | | | |
| 1st measurement | −59.8 | −70.0 | −74.9 | −58.5 | −66.5 | −39.1 |
| 2nd measurement | −55.8 | −64.5 | −70.8 | −54.7 | −61.0 | −42.5 |
| | Values in °K | | | | | |
| 1st measurement | 213.4 | 203.2 | 198.3 | 214.7 | 206.7 | 234.1 |
| 2nd measurement | 217.4 | 208.7 | 202.4 | 218.5 | 212.2 | 230.7 |

$1^{st}$ measurement is first heating cycle, $2^{nd}$ measurement is second measurement. The $3^{rd}$ is not given as the values do not significantly differ from the $2^{nd}$ measurement.

From table 2 it can be seen that the present compositions 1-3 perform better in terms of glass transition temperature $T_g$, compared to prior art adhesive compositions 4 and 5. It is noted that a slight difference between the results of first and second measurement for the glass transition temperature is present; such is considered typical as the result varies from first to second measurement and thereafter (third and subsequent measurement) remains constant. In this sense the second measurement may be considered as more indicative for the adhesives. At an equal amount of plasticizer sample 2 has a lower $T_g$ compared to samples 4 and 5, which indicates that sample 2 will stay (more) elastic at a lower temperature compared to 4 and 5. A lower $T_g$ may be considered, amongst others, as an indication of a better contactibility of the adhesive composition and a longer open time.

The tensile strength is measured according to ISO 37/DIN 53504.

TABLE 3

Results of the tensile tests according to ISO 37/DIN 53504 on the adhesive compositions of table 1.
Tensile Strength measurement according ISO37/DIN53504
Equipment: Zwick Z010
Elongation speed is 2000 mm/min.
Dumbell-shaped sample S2.

| Elongation | Sample no. 1 | 2 | 3 | 4 | 5 | 6 |
|---|---|---|---|---|---|---|
| | Tensile Strength at a given elongation in $N/mm^2$ or MPa, measured at Room Temperature. | | | | | |
| 50% | 1.94 | 1.78 | 1.29 | 1.45 | 1.70 | 3.27 |
| 100% | 2.04 | 1.89 | 1.40 | 1.56 | 1.84 | 3.26 |
| 200% | 2.56 | 2.53 | 1.75 | 1.92 | 2.37 | 3.60 |
| | Tensile Strength at a given elongation in $N/mm^2$ or MPa, measured at −25° C. | | | | | |
| 50% | 3.26 | 2.97 | 2.20 | 3.21 | 3.54 | 6.44 |
| 100% | 3.77 | 3.64 | 2.71 | 3.83 | 4.32 | — |
| 200% | 4.90 | 5.25 | 3.85 | 5.40 | 6.11 | — |

From table 3 it can be seen that sample 2 has a lower tensile strength at lower temperatures such as −25° C. A lower tensile stress shows that Sample 2 is more flexible at this temperature compared to samples 4 and 5 (prior art). Also, this lower tensile strength in sample 2 compared to samples 4 and 5 is not present at room temperature. This shows the tensile strength of sample 2 does not increase as much as samples 4 and 5. This shows again that sample 2 is the better choice for low temperatures.

TABLE 4

Results of pH measurements during storage on the adhesive compositions of table 1
pH measurements
Equipement: Mettler Toledo MP220; Electrode: InLab Pro Rotine pH
Measured at Room Temperature

| | Sample no. 1 | 2 | 3 | 4 | 5 | 6 |
|---|---|---|---|---|---|---|
| 1 day | 12.56 | 12.55 | 12.49 | 12.49 | 12.42 | 12.57 |
| 84 days | 12.34 | 12.32 | 12.18 | 11.07 | 10.22 | 12.34 |
| 254 days | 11.83 | 11.61 | 11.18 | 9.98 | 9.49 | 11.62 |
| Δ pH | | | | | | |
| Δ pH, 84 days | −0.22 | −0.23 | −0.31 | −1.42 | −2.20 | −0.23 |
| Δ pH, 254 days | −0.73 | −0.94 | −1.31 | −2.51 | −2.93 | −0.95 |

From table 4 it can be seen that the pH of sample 2 when stored does decrease much less compared to the samples 4 and 5. The decrease of the pH is a measurement of storage stability so this shows that the plasticizer of the present invention is much more storage stable in this alkaline environment than the plasticizers of the prior art.

It should be appreciated that for commercial application it may be preferable to use one or more variations of the present system, which would similar be to the ones disclosed in the present application and are within the spirit of the invention.

What is claimed is:

1. Aqueous adhesive composition comprising (a1) 40-97 wt. % of a dispersion, comprising one or more of polychloroprene dispersion, polyurethane dispersion, natural rubber dispersion, styrene-butadiene-styrene copolymer dispersion, nitrile-butadiene rubber, polyvinyl butyral dispersion, styrene-butadiene rubber dispersion, and combinations thereof, the dispersion comprising 30-80 wt. % solids, (a2) 2-50 wt. % plasticizer, wherein the plasticizer is selected from mono-esters from benzoic acid and a $C_4$-$C_{16}$ alcohol, and combinations thereof, (a3) 0.0-5 wt. % surfactant, (a8) 0.1-40 wt. % pH stabilizer, (a9) 0.1-2 wt. % of one or more of a fungicide, a bactericide, and an algaecide, and preferably at least one of (a5) 0.1-40 wt. % of a resin dispersion, the resin dispersion comprising 30-70 wt. % solids, (a6) 0.1-8 wt. % of an acid binder, (a7) 0.1-15 wt. % thickener, (a10) 0.001-1 wt. % defoamer, (a11) 0.001-1 wt. % emulsifier, (a12) 0.001-1 wt. % wetting agent (a13) 0.1-2 wt. % of a colorant, and (a14) 0.1-3 wt. % of anti-degradant, (a4) the remainder being water, wherein all parts are calculated based on the total weight of the composition.

2. Adhesive composition according to claim 1, further wherein the alcohol is selected from single branch alcohols, branched alcohols, primary alcohols, secondary alcohols, tertiary alcohols, substituted alcohols, and combinations thereof.

3. Adhesive composition according to claim 1, wherein the alcohol is a $C_9$-$C_{11}$ alcohol.

4. Adhesive composition according to claim 1, wherein the dispersion (a1) comprises 16-97 wt. % polychloroprene dispersion.

5. Adhesive composition according to claim 1, wherein a dynamic viscosity is 20-25000 mPa*s (according to ISO 2555).

6. Adhesive composition according to claim 1, wherein a pH is 7-13.5.

7. Adhesive composition according to claim 1, wherein a glass transition temperature is 193-223K (−80 to −50° C.) (according to ISO 22768).

8. Adhesive composition according to claim 1, wherein (a6) the acid binder is one or more of a basic metal salt.

9. Adhesive composition according to claim 1, wherein (a7) the thickener is one or more of a gum.

10. Product comprising an adhesive composition according to claim 1.

* * * * *